(12) United States Patent
Makita

(10) Patent No.: US 6,404,726 B1
(45) Date of Patent: Jun. 11, 2002

(54) OPTICAL DISK DRIVE HAVING A SWING ARM

(75) Inventor: Akihiko Makita, Akashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/326,773

(22) Filed: Jun. 4, 1999

(30) Foreign Application Priority Data

Jun. 15, 1998 (JP) .......................................... 10-166850

(51) Int. Cl.$^7$ .............................. G11B 7/08; G11B 11/12
(52) U.S. Cl. .................................. 369/222; 369/244
(58) Field of Search ............................. 369/222, 244; 360/254.2, 264.1, 264.3, 267.2

(56) References Cited

U.S. PATENT DOCUMENTS

| 4,403,316 A |   | 9/1983  | van de Veerdonk ........... 369/44 |
|---|---|---|---|
| 4,607,358 A |   | 8/1986  | Meada et al. ................. 369/44 |
| 4,794,586 A |   | 12/1988 | Korth .......................... 369/215 |
| 4,845,579 A | * | 7/1989  | Wilkinson, Jr. ............. 360/106 |
| 4,979,063 A | * | 12/1990 | Ghose et al. ................ 360/106 |
| 4,996,617 A | * | 2/1991  | Yaeger et al. ................ 360/105 |
| 5,097,361 A | * | 3/1992  | Childers et al. ............ 359/824 |
| 5,132,944 A |   | 7/1992  | Berg ........................... 369/13 |
| 5,233,581 A | * | 8/1993  | Suzuki ..................... 369/44.19 |
| 5,317,559 A | * | 5/1994  | Bronsvatch ................. 369/244 |
| 5,432,763 A | * | 7/1995  | Campbell et al. ......... 369/44.19 |

FOREIGN PATENT DOCUMENTS

| DE | 69219005 T2 |   | 11/1997 |
|---|---|---|---|
| EP | 0 400 570 A2 | * | 12/1990 |
| JP | 60-106035   | * | 6/1985 |
| JP | 0061087280  |   | 5/1986 |
| JP | 63-37830    | * | 2/1988 |
| JP | 1-229435    | * | 9/1989 |
| JP | 5-128580    | * | 5/1993 |
| JP | 6-68508     | * | 3/1994 |

OTHER PUBLICATIONS

Gutmann ("18 Ways To Control Backlash in Gearing", Product Engineering, Oct. 26, 1959 pp. 71–75).*

* cited by examiner

*Primary Examiner*—William Klimowicz
(74) *Attorney, Agent, or Firm*—Greer, Burns & Crain, Ltd.

(57) ABSTRACT

An optical disk drive has a swing arm that is pivotally supported and upon which is mounted an optical head. The optical head illuminates a small laser beam spot, through an objective lens, onto an optical disk. The swing arm is rotated around a pivotable supporting assembly by a rotary motor through a gear train. One of the gears in the gear train is mounted on a tip of the arm. The arm is stably supported at two portions—one portion being the pivotable supporting assembly and the other portion being the rotary motor cooperating with the gear train. One of gears in the gear train preferably has a backlash eliminator including a plurality of associated gears, one of which is elastically suspended by a biasing element that applies a force in a constant direction. The rotary motion of the rotary motor is transferred to arm-rotation without slippage. The drive has an electromagnet, which applies a magnetic field onto the disk and is mounted a position opposite to the objective lens with respect to the disk.

12 Claims, 7 Drawing Sheets

Figure 1:
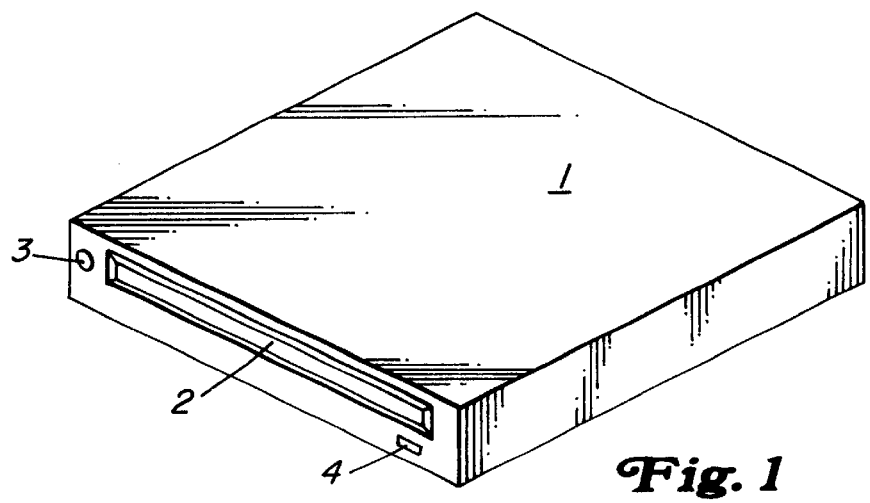

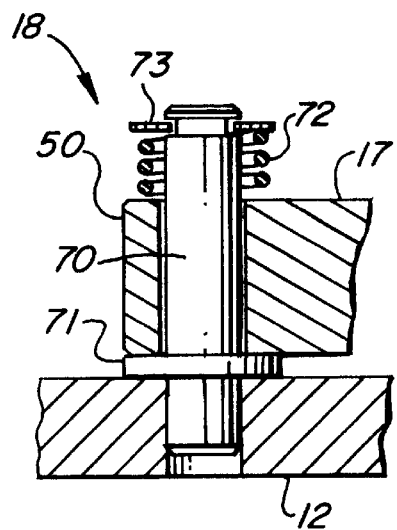
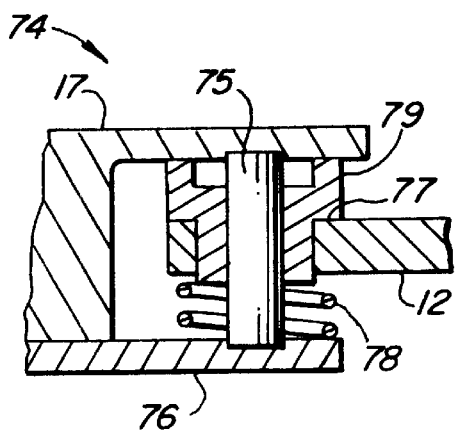
Fig. 5  Fig. 6
Fig. 7A
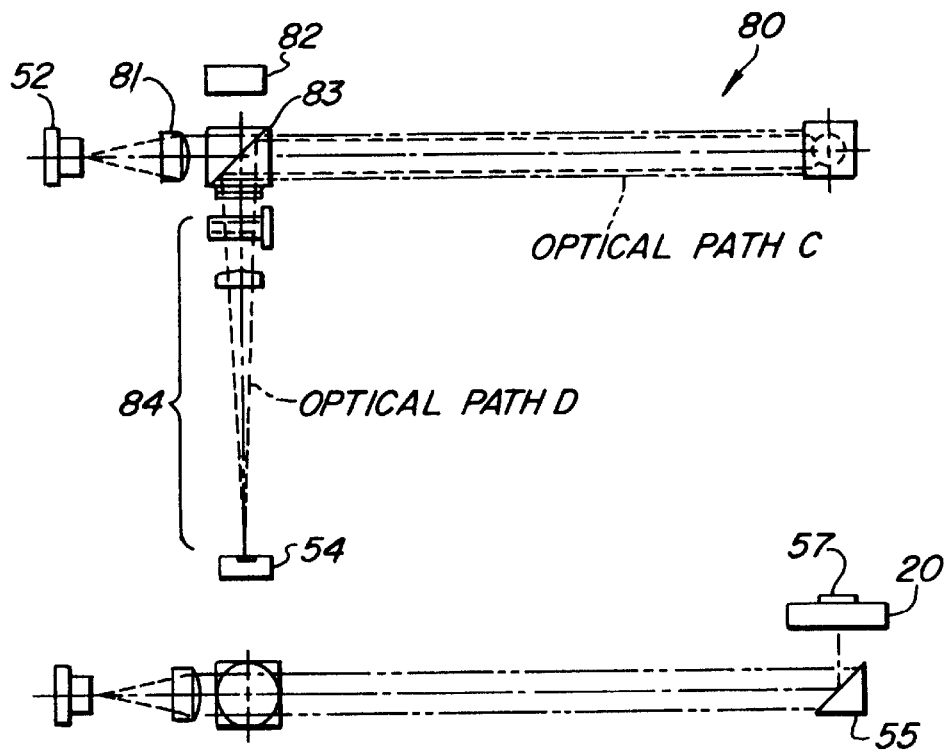
Fig. 7B

OPTICAL DISK DRIVE HAVING A SWING ARM

BACKGROUND OF THE INVENTION

1. Field of the Invention

This invention relates to an optical disk drive for use with an optical disk for reading and/or writing information. More particularly this invention relates to an optical disk drive having a swing arm mounting for an optical unit for illuminating the optical disk.

2. Description of the Related Art

An optical disk drive reads and/or writes information consisting of characters, image data, audio data, or binary data on an optical disk with the use of a laser beam that is transmitted from a semiconductor laser.

As the optical disk drive employs a removable optical disk having a higher data storage capacity than other removable recording media, the disk drive is popularly used as an external storage unit, and is quickly becoming an indispensable part of an information processing apparatus. As the disk drive reads and/or writes information on a track formed concentrically or spirally on the optical disk, tracking of a small laser beam spot onto a desired track is required. As the spot is provided by focusing the laser beam with an objective lens mounted within an optical head, the spot can track a desired track by adjusting the position of the objective lens and by carrying the optical head to the desired location. It is necessarily to move the optical head back and forth in the radial direction of the optical disk over the range where the tracks are present in order to be able to access all of the tracks.

As the arrangement for carrying the optical head occupies a considerably large space in the disk drive, to make the arrangement smaller would permit miniaturization of the drive, which would increase the popularity of the disk drive.

There are two basic types of arrangements for carrying the optical head. In the first arrangement, the carriage carries the optical head back and forth in the linear direction. The first arrangement has been adopted for use in compact disk drives and CD-ROM drives, which each use the optical disk as a read-only memory for their associated computer system or other system. The first arrangement has a lead screw connected to a motor, and a ball-nut assembly connected to a carriage for mounting the optical head. Motor rotary motion is changed into the linear motion of the carriage by the lead screw and the ball-nut assembly. The linear motion tends to produce an energy loss resulting from frictional contact, and needs additional guide-parts for smooth and accurate motion of the carriage.

The second arrangement is called a swing arm type or a rotary arm type, which is, for example, described in U.S. Pat. No. 5,132,944, and is used for magneto-optical disk drives. The swing arm in U. S. Pat. No. 5,132,944 is supported at only a single portion thereof by a pivotable supporting assembly. As the driving unit includes a VCM (Voice Coil Motor) and an optical head, which are both mounted on the same side of the arm, the arm acts as a cantilever to support the weights of the VCM and the optical head. In this arrangement, preventing excess deflection of the arm normally requires increasing the stiffness of the arm, and often results in increasing the size of arm. Furthermore, smooth rotary motion of the arm usually requires a large sized pivotable supporting assembly for stiffening a shaft and a sleeve included within the assembly, as well as the use of ball bearings mounted within the assembly, in order to prevent frictional meshing caused by the biased load. Still more, it may be necessary to use a powerful driving unit, such as an expensive VCM, for smooth rotation of the arm while overcoming the frictional meshing. The use of the arm as a cantilever, such as in this arrangement, tends to increase the size and the cost of the disk drive.

Additionally, the larger the diameter of the optical disk is, the longer and heavier the arm needs to be, which then requires that the pivotable supporting assembly be of a larger size in order to prevent excessive deflection. In order to increase the popularity of the optical disk drive, a carriage arrangement suitable for small and low cost drives appears to be necessary.

SUMMARY OF THE INVENTION

An object of this invention is to provide an improved optical disk drive for use with an optical disk that includes a rotary motor, a swing arm for supporting an optical head to illuminate a laser beam onto the optical disk, and a supporting means. The supporting means supports the swing arm to pivotally move along a plane that is parallel to a surface of the optical disk. The swing arm is moved by the rotation of the motor, which is conveyed through a gear train consisting of a first toothed gear (which is mounted on the motor) and a second toothed gear (which is meshed with the first gear, and is mounted on an end of the arm).

In the present invention, as the arm is supported at two areas—the supporting means and the gear train—the decreased load applied to the supporting means permits the use of a small and simple supporting means. Further, the decreased deflection of the arm allows the use of a small and lightweight arm. In addition to these advantages, a reduction ratio of the gear train allows for the use of a low output motor for driving the arm.

Other objects and advantages of the present invention will be apparent from the following description, the appended claims and accompanying drawings.

A BRIEF DESCRIPTION OF THE DRAWINGS

Figure 2A:
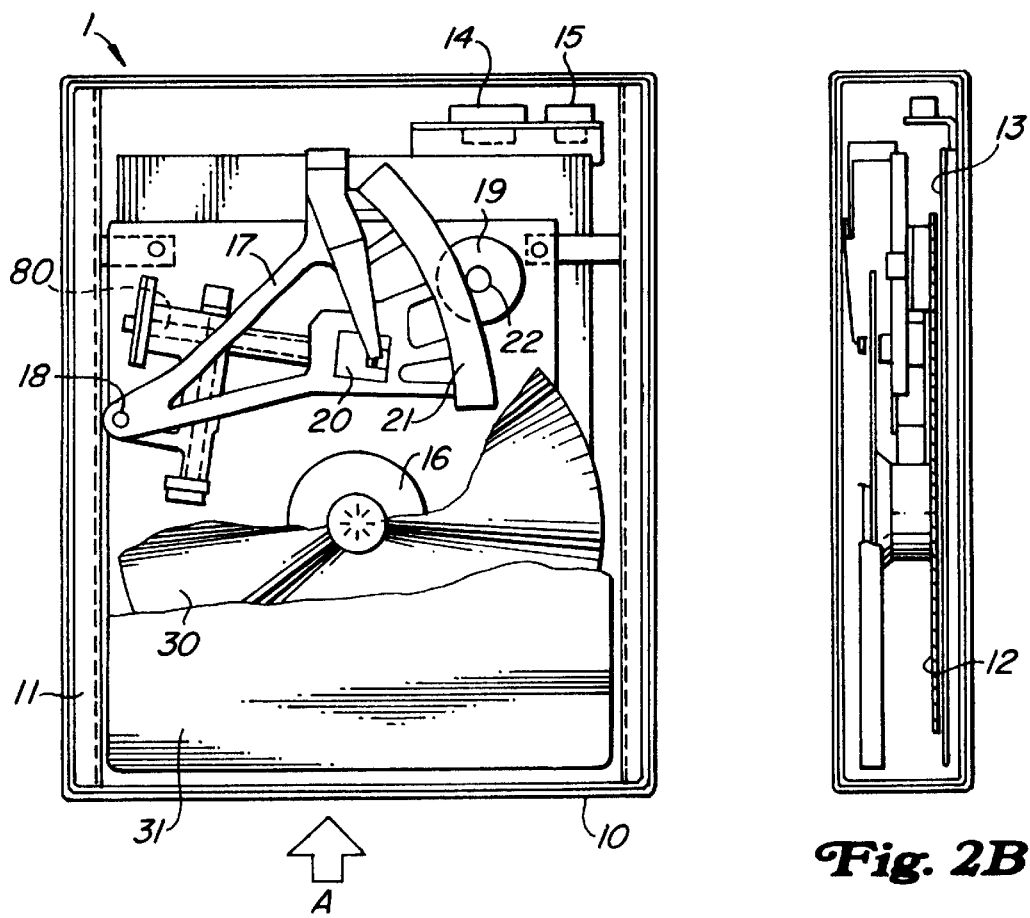
Figure 2B:
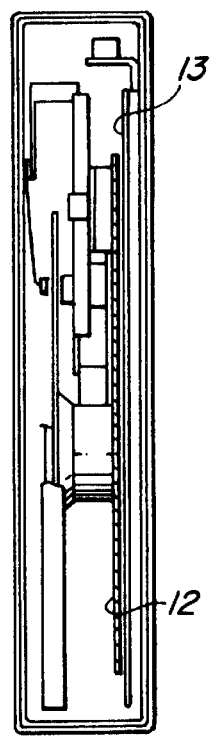
Figure 3:
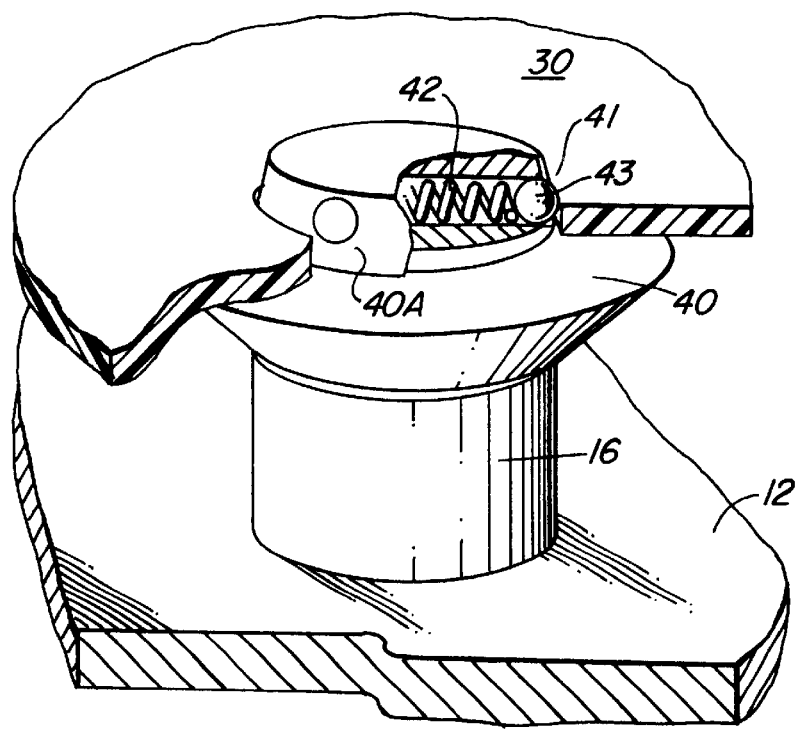
Figure 4:
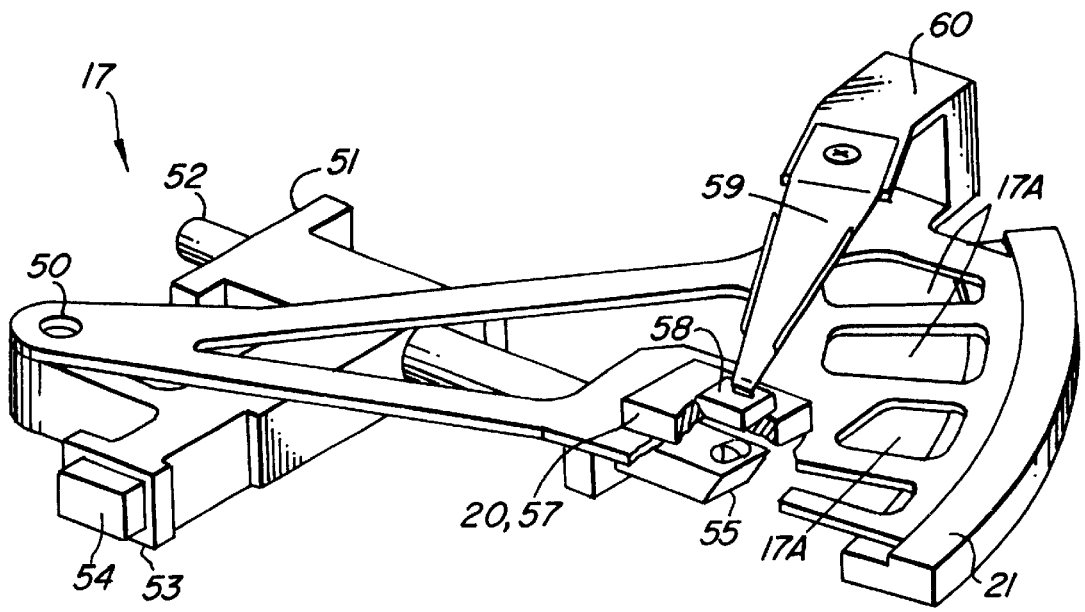
Figure 8:
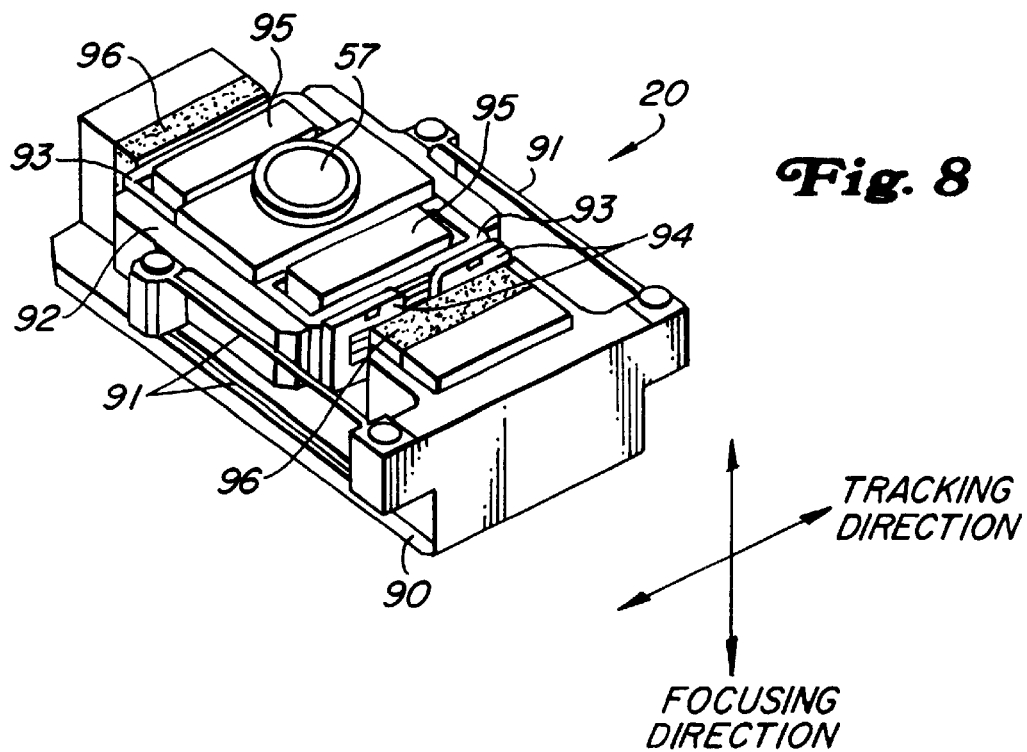
Figure 9:
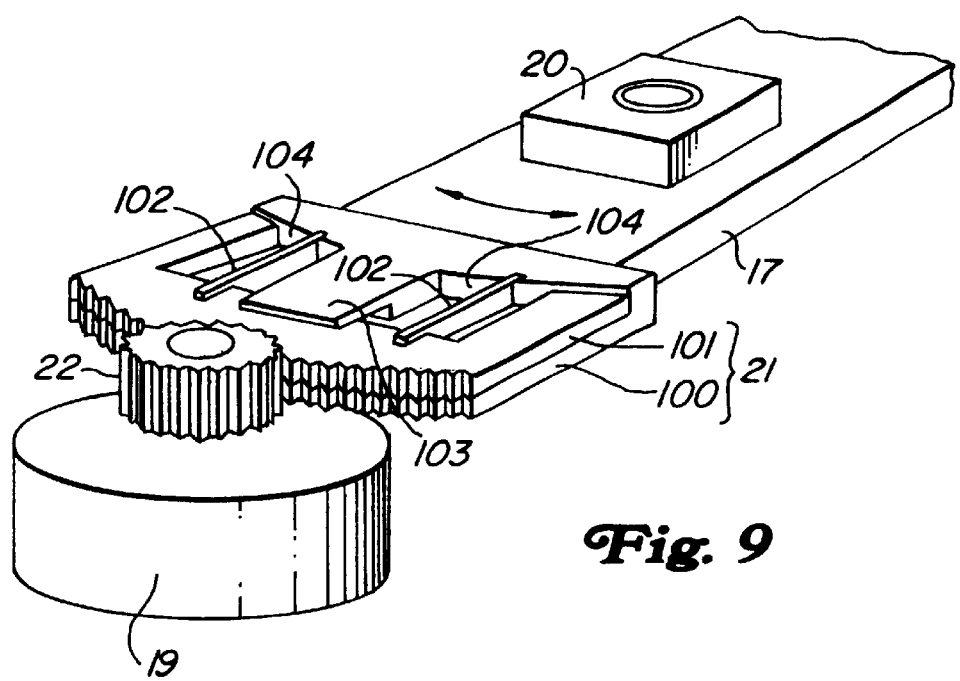
Figure 10:
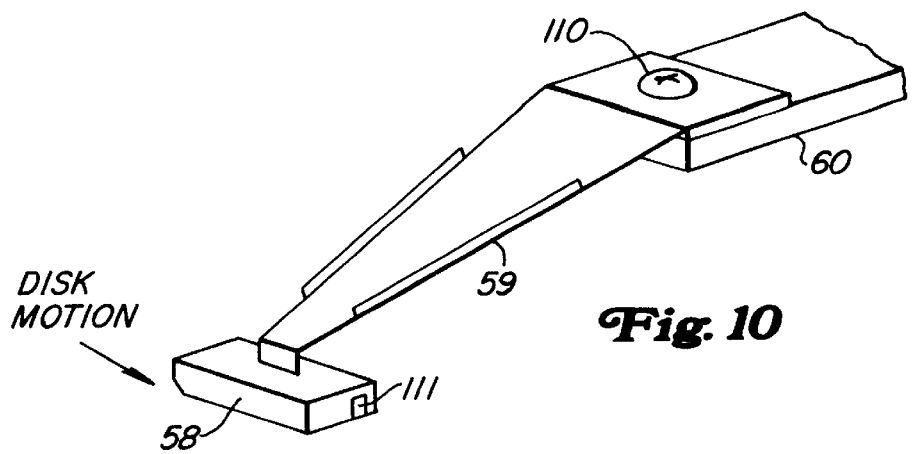
Figure 11A:
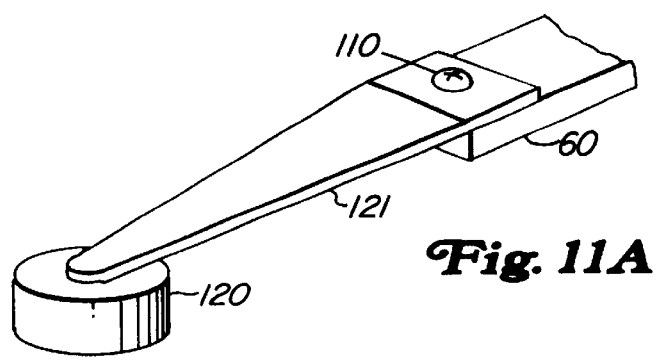
Figure 11B:
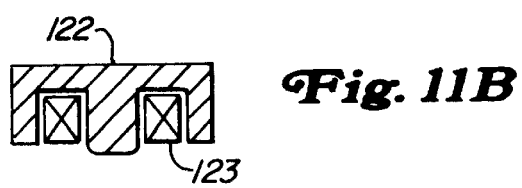
Figure 12:
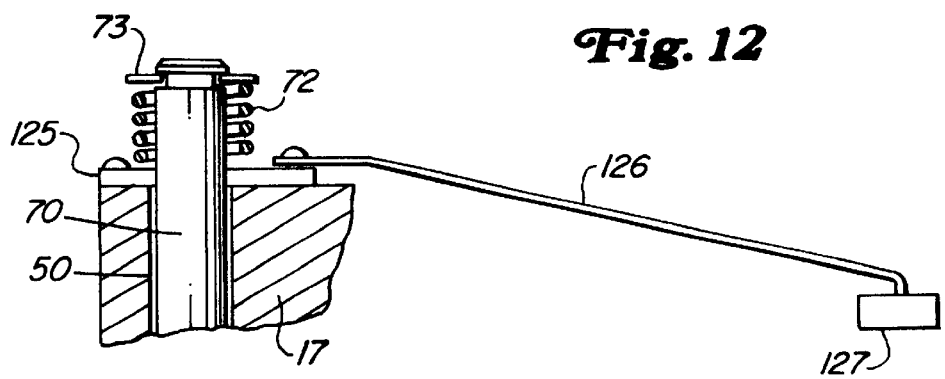
Figure 13A:
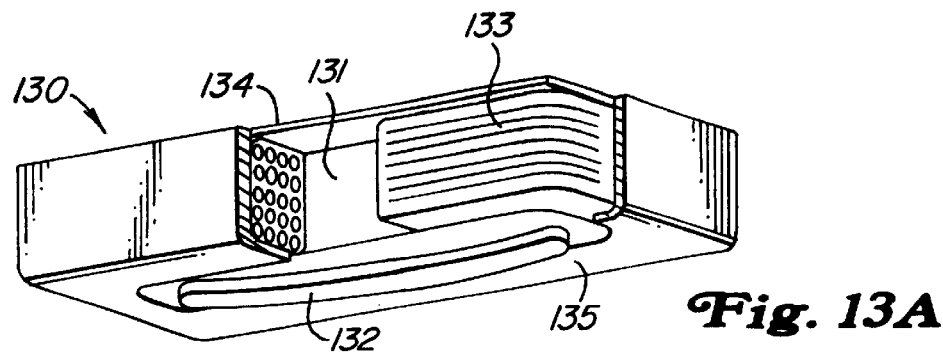
Figure 13B:
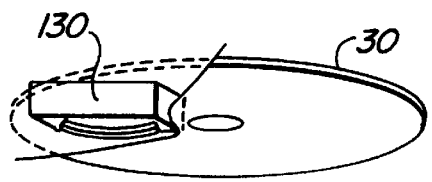
Figure 14A:
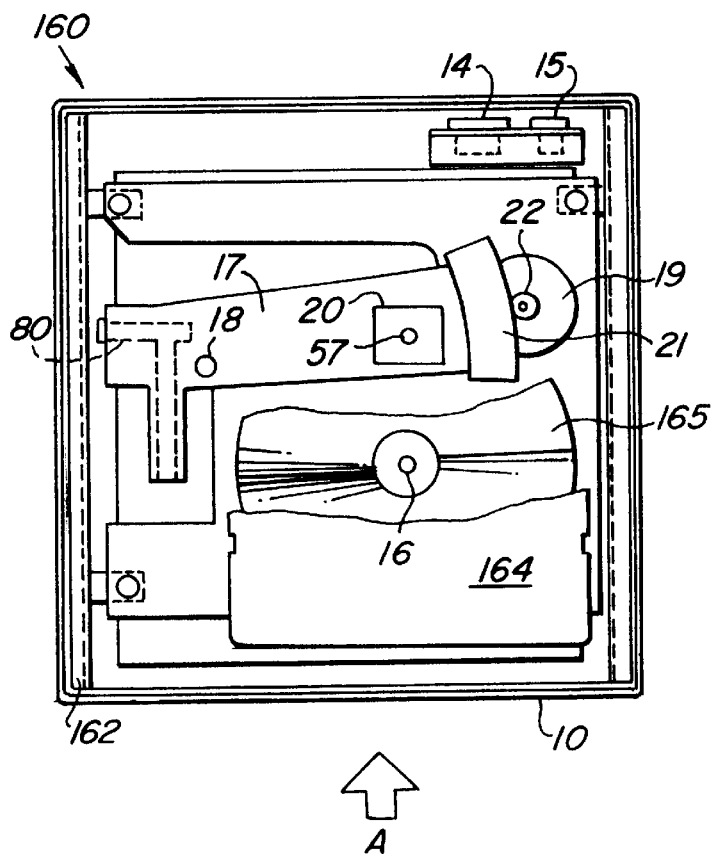
Figure 14B:
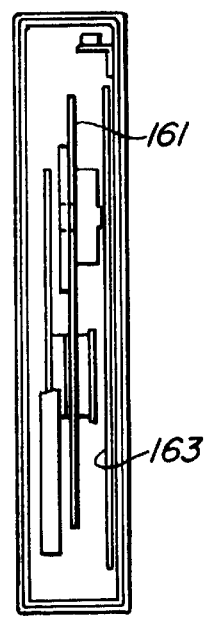
Figure 15:
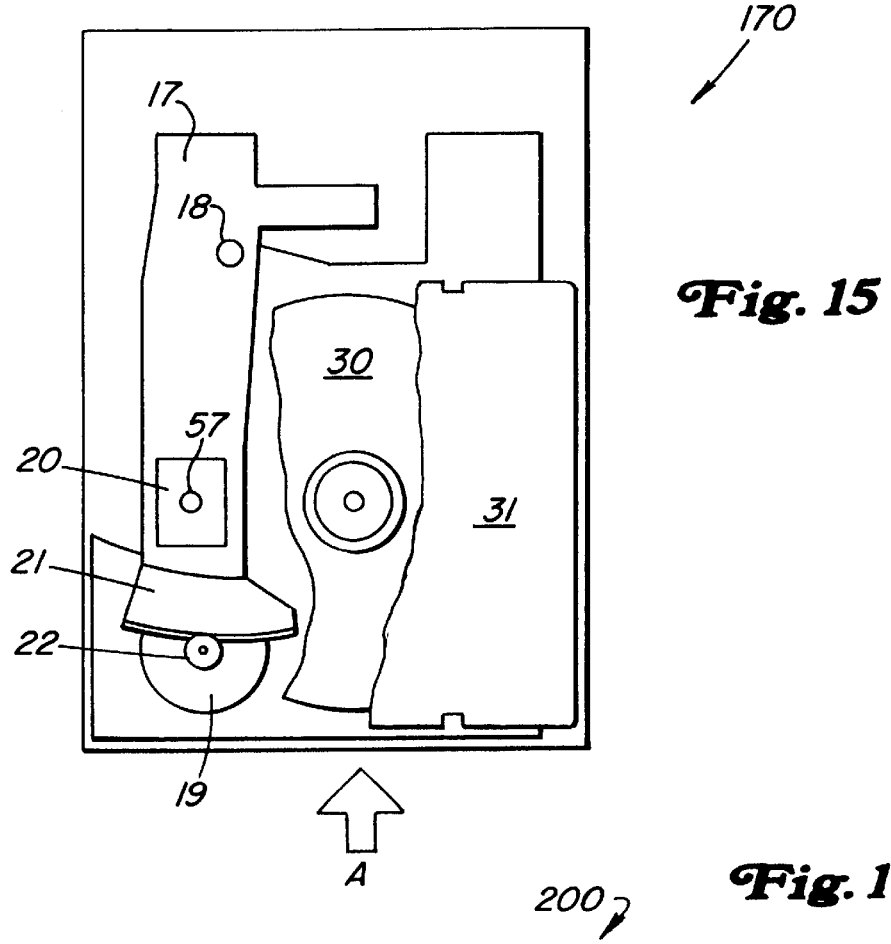
Figure 16:
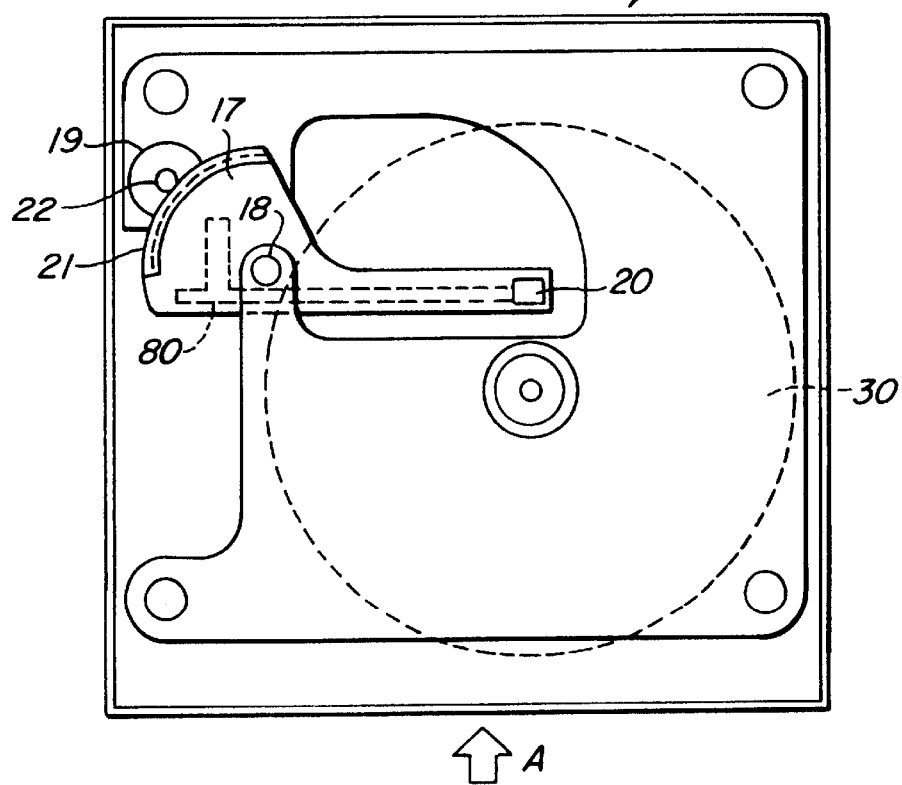

FIG. 1 shows a general view of an optical disk drive in a first preferred embodiment of the present invention;

FIG. 2A schematically shows a plane view of the optical disk drive of the first preferred embodiment;

FIG. 2B schematically shows a right side view of the first preferred embodiment;

FIG. 3 schematically shows a turntable of the first preferred embodiment;

FIG. 4 schematically shows a swing arm, an optical head and an electromagnet of the first preferred embodiment;

FIG. 5 schematically shows an arrangement of the components in the area near the pivotable supporting assembly of the first preferred embodiment;

FIG. 6 schematically shows another arrangement of the components near the pivotable supporting assembly of the first preferred embodiment;

FIG. 7A schematically shows a plane view of an arrangement of an optical head of the first preferred embodiment;

FIG. 7B schematically shows a side view of an arrangement of the optical head of the first preferred embodiment;

FIG. 8 schematically shows a lens actuator of the first preferred embodiment;

FIG. 9 schematically shows a backlash eliminator mounted near the tip of the arm in the first preferred embodiment;

FIG. 10 schematically shows a first type of magnet with a suspension in the first preferred embodiment;

FIG. 11A schematically shows a second type of magnet with a rigid suspension as used in the first preferred embodiment;

FIG. 11B shows a sectional view of FIG. 11A;

FIG. 12 schematically shows a third type of fixture of a slider type magnet in the first preferred embodiment;

FIG. 13A schematically shows a fourth type of magnet which is a fixed fixture in the first preferred embodiment;

FIG. 13B schematically shows the location of the fourth type of magnet;

FIG. 14A schematically shows a plane view of an optical disk drive of a second preferred embodiment;

FIG. 14B schematically shows a right side view of FIG. 14A;

FIG. 15 schematically shows a plane view of an optical disk drive of a third preferred embodiment;

FIG. 16 schematically shows a plane view of an optical disk drive of a fourth preferred embodiment.

DESCRIPTION OF THE PREFERRED EMBODIMENTS

An optical disk drive is usually used as a storage unit in such systems as computer systems, audio systems, and video systems. The user of these systems inserts an optical disk into the disk drive, and the desired information is then read from and/or written onto the disk. The optical disk is suitable to be easily used for such purposes, and it requires a disk drive arrangement that has the necessary internal space for transporting the disk into and out of the disk drive. Because this transportation-space cannot be obstructed by the components of the disk drive arrangement, it is preferable to mount each component either above or below the transportation-space. Therefore it is desired to decrease the heights of these components, and to efficiently arrange these components in the vertical direction in order to obtain a disk drive that is as small and thin as possible.

In the preferred embodiments described herein, the front side of the disk drive refers to the side from which the optical disk is inserted into the disk drive. It should be noted that although the examples of the disk drives described herein are configured to use disks mounted within disk cartridges, the present invention also applies to disk drives that use disks without cartridges. It should also be noted that the disk drives described herein are magneto-optical disk drives that have electromagnets for applying a magnetic field that is used for reorientation of the magnetic direction of the disk in order to write information thereon. However, the present invention is also applicable to other types of optical disk drives.

Referring now to FIG. 1 through FIG. 13, the first preferred embodiment will be explained. The example of the first embodiment described herein is dedicated to a disk drive that uses a disk of 120 mm diameter, although other sizes of disks are also contemplated as being within the scope of the invention. FIG. 1 schematically shows a general view of the disk drive 1. The disk is transferred into and out of the disk drive 1 through drawer 2, which has a door on the front panel. An eject button 3 for starting the disk-eject-operation and a lamp 4 with an LED for indicating the visual status of the disk are also mounted on this same front panel.

FIGS. 2A and 2B show the general shapes and preferred locations of the parts necessary for understanding the present invention. FIG. 2A shows a plane view of the disk drive 1, and FIG. 2B shows a right side view of the same. Outermost of the disk drive 1 is a several part housing 10, whose parts are bolted together with a frame 11. A connector 14 for connecting the cable which transfers data from and to other equipment, and a connector 15 for connecting the power supply cable are mounted on the backside of the housing 10. A base plate 12, which is elastically supported by the frame 11, prevents the parts mounted thereon from being affected by shocks that may be applied to the disk drive 1. In the first preferred embodiment, rubber parts (not shown) are used for elastically supporting the base plate 12, but cylindrically coiled springs, leaf springs, or other arrangements may also be used for this same purpose.

Under the base plate 12, a printed circuit board 13 for mounting circuitry is mounted to the frame 11. The circuitry on the printed circuit board 13 is electrically connected to the connectors 14 and 15 by cables (not shown in FIG. 2A and 2B). The printed circuit board 13 is also electrically connected to other parts of the disk drive 1, such as an electromagnet and an optical head 80, which will be explained hereinafter.

A spindle motor 16 for rotating a disk 30 is mounted on the base plate 12. The spindle motor 16 is preferably not centered along the longitudinal direction of the disk drive 1, but is instead mounted closer to the front side of the disk drive 1. The disk 30, which in this embodiment is mounted in a cartridge 31, is inserted into the disk drive 1 in the direction of arrow "A", and is aligned so that the disk center coincides with the rotational shaft of the spindle motor 16. A well-known mechanism for loading the disk 30 into the disk drive 1 may be employed in the present invention, and such mechanism is therefore not shown in FIGS. 2A and 2B. Near the left side of the disk drive 1 (as shown in FIG. 2A), a pivotable supporting assembly 18 is located. The pivotable supporting assembly 18 pivotally supports a swing arm 17, upon which is mounted the optical head 80. A lens-actuator 20, which includes an objective lens (not shown), is mounted on the arm 17 near the center of the disk drive 1. A first gear 22 is mounted on the rotational shaft of a rotary motor 19, such as a DC motor, a stepping motor and an ultrasonic motor. A second gear 21 is mounted on the opposite end of the arm 17 from the supporting assembly 18. The second gear 21 meshes with the first gear 22. The rotary motor 19 is mounted on the base plate 12. The disk drive is made thinner by designing the shape of the base plate 12 to provide spaces for arm-movement and for the spindle motor 16. As the swing arm 17 is supported at two portions (one portion is the pivotable supporting assembly 18 and the other portion is the rotational shaft of the drive motor 19 cooperating with the pair of the gears 21 and 22), the load upon the pivotable supporting assembly 18 is decreased, and the deflection of the arm 17 caused by the load is also decreased, as compared with the load of a conventional cantilever type swing arm.

In the present invention, the arm 17 is effectively driven by the motor 19 through the pair of gears 21 and 22. Also, by selecting a large reduction gear ratio, it is possible to use a low torque motor (preferably a flat-type motor) as the motor 19 of the disk drive 1.

Referring to FIG. 3 through FIG. 13, the main elements and assemblies of the present invention will be described in more detail. FIG. 3 shows an arrangement for fixing the disk 30 upon a turntable 40. The turntable 40 is fixed to the rotational shaft of the spindle motor 16. The turntable 40 has a convex head 40A for positioning and locking the disk 30. There are a plurality of balls 43 projecting from a plurality of openings 41 in a tapered sidewall of the convex head 40A.

Each of the balls 43 is pushed by a spring 42 towards the outside of its associated opening. When the balls 43 are pressed into the side wall as the disk 30 is transferred from the top to the bottom of the convex head 40A, the disk 30 is mounted on the turntable 40 and is locked in place by the balls 43 projecting out of the openings 41. A center hole of the disk 30 and the convex head are fixed so that both of their axes coincide. Accordingly, the axes of the disk 30 and the spindle motor 16 are aligned.

Referring next to FIG. 4, the arrangement of the arm 17 will be described. On the arm 17 there is a hole 50 that is configured for mating with a shaft for pivotally supporting the arm 17 at its left end. The second gear 21 is configured to cooperate with the first gear 22 (FIG. 2A) to support the right end of the arm 17. The underside of the arm 17 includes a tubular configuration for mounting optical elements, which will be described hereinbelow. The tubular configuration is suitable for preventing the optical elements from being affected by optical disturbances, such as external optical beams from the unit and dust present within the unit. Upon one end 51 of the tubular configuration is mounted a semiconductor laser 52 for emitting a laser beam. Upon another end 53 of the tubular configuration is mounted an optical detector 54 for receiving a laser beam reflected back from the disk 30. The path of the laser beam emitted from the laser 52 is bent by a bending mirror 55 so as to impinge the beam upon the disk 30 in an orthogonal direction through an objective lens 57 that is located within a lens actuator 20. A magnetic head 58 for applying a magnetic field over the optical disk 30 is positioned on the opposite side of the objective lens 57 from the optical disk 30. The head 58 is fixed on a suspension 59, which is bolted to a head-supporting fixture 60 formed on the arm 17. The head 58 will be described in detail hereinafter. The arm 17 is preferably cast from aluminum alloy, although other materials, such as aluminum, iron, iron alloy, resin, and their composite materials, may also be used. Holes, such as holes 17A, may be included in the arm 17 for decreasing its weight. Rims may also be included in the arm 17 to increase its stiffness.

Next, referring to FIG. 5 and FIG. 6, the pivotable supporting assemblies will be, described. FIG. 5 shows a first preferred embodiment of a pivotable supporting assembly for the arm 17, and FIG. 6 shows another embodiment of this same assembly. The arm 17 requires smooth rotary motion around the assembly 18, which may be provided for by the use of ball bearings mounted on a shaft.

As the arm 17 is supported at two locations in the present invention, the overall load is divided into two smaller loads. The small load applied to the pivotable supporting assembly 18 permits the adoption of a simple arrangement having a pivotably mating sleeve and shaft. In this embodiment, the sleeve is simply formed by a hole 50 within the arm 17. A shaft 70 positioned at the center axis of the rotary motion of the arm 17 is fixed to the base plate 12 by pressing. The flange 71 of the shaft 70 provides a precisely dimensioned spacer between the arm 17 and the base plate 12. The flange also provides a precise angle for the center axis of the shaft 70 with respect to the base plate 12. It should be noted that as an alternative, a separate spacer may also be used instead of the flange 71.

The shaft 70 is pivotally mated with the hole 50 of the arm 17, and the arm 17 is pushed to the flange 71 by a spring 72 so that the arm 17 is precisely positioned with respect to the base plate 12. The spring 72 is fixed around the shaft 70 by a retaining ring 73, which prevents the spring 72 from moving out of place. A lubricant is preferably applied to the gaps between the shaft 70 and the hole 50, as well as between the arm 17 and the flange 71, in order to provide for smoother rotary motion. An oil-impregnated sintered bearing pressed into the hole 50 is also preferably used for the same purpose. The shaft 70 is preferably secured to the base plate 12 by pressing in order to help to minimize the overall thickness of the disk drive 1. However, securing these components with a bolt or brazing is also contemplated as being within the scope of the invention.

Referring now to FIG. 6, another preferred embodiment of a pivotable supporting assembly is shown. In this second embodiment, which is referred to as assembly 74, a shaft 75 is secured to the arm 17 by a securing plate 76, and a sleeve 77 is pressed into the base plate 12. The sleeve 77 has a hole that pivotally mates with the shaft 75. A spring 78 presses a flange 79 of the sleeve 77 into the arm 17. The flange 79, which is an upper part of the sleeve 77, has the same role as the flange 71 in FIG. 5. As in the FIG. 5 embodiment, in this embodiment it is also preferable to apply a lubricant into the gaps between the shaft 75 and the sleeve 77, as well as between the arm 17 and the flange 79, in order to obtain smooth rotary motion. The embodiments of FIG. 5 and FIG. 6 show that a simple combination of a shaft and a sleeve can provide a pivotable supporting assembly that is suitable for supporting the arm 17.

Now referring to FIGS. 7A–7B and FIG. 8, the optical head 80 is shown and explained to the extent necessary for an understanding of the present invention. FIG. 7A is a plane view that schematically shows the locations of the parts in the head 80, and FIG. 7B is a side view of the head 80. The semiconductor laser 52 emits a laser beam which is transformed into a parallel beam (ray) by a collimator lens 81. The parallel beam is split by a beam splitter 83 into an optical path C that extends toward the optical disk (not shown) and also toward another optical path that extends toward a light quantity sensor 82. The light quantity sensor 82 monitors the quantity of the laser beam in order to control the output of the laser 52.

Referring to FIG. 7B, the parallel beam on the optical path C is bent by a bending mirror 55 toward the direction of the objective lens 57, which is located within the lens actuator 20. Then the beam focused by the objective lens 57 impinges on, and is reflected back by, the optical disk (not shown). The beam is modulated by information stored on the disk 30. The beam then travels backward along the optical path C through the objective lens 57 and the bending mirror 55. Upon reaching the beam splitter 83, the beam traveling backwards is split into an optical path D in an optical unit 84 for separation of the signals within the beam. It should be noted that almost any type of optical unit can be utilized in the present invention. The split beam is received, and is transformed into an electrical signal by the optical detector 54, which is located within the optical unit 84. The signal is processed into signals indicating the track error and the information recorded on the disk 30.

Referring to FIG. 8, the lens actuator 20 will be explained. The actuator 20 moves the laser beam spot (that is directed upon the disk 30) in two different directions by actuating the objective lens 57. The first direction is perpendicular to the disk surface (for focusing the laser beam onto the disk 30) and the second direction is across the tracks on the disk 30 (for tracking the laser beam spot onto the track). The objective lens 57 is mounted in a case 92 that is suspended by four wires 91, three of which are shown in FIG. 8 and one of which is hidden by the other parts. One end of each of the wires 91 is attached to the case 92. The opposite ends of each of the wires 91 are secured to a base 90. Two kinds of coils—focusing coils 93 and a tracking coil 94—are mounted on the case 92. Two focusing coils 93 enclose two yokes 95, respectively. The tracking coil 94 includes a pair of small coils. Two tracking coils 94 are mounted on each focusing coil 93, only one of which is shown in FIG. 8. Both kinds of coils are located within the magnetic fields produced by permanent magnets 96 and yokes 95. When a current is applied to the focusing coils 93, a force (which obeys Fleming's left had rule) is produced on the focusing coils 93, and the objective lens 57 is moved in the focusing direction shown in FIG. 8. Changing the direction of the current applied to the focusing coils 93 causes the objective lens 57 to be moved in the opposite direction. Similarly, when applying a current to the tracking coils 94, a force is produced on the tracking coils 94, and then the objective lens 57 is moved in the tracking direction shown in FIG. 8.

Referring to FIG. 9, the first and second gears 22 and 21 will be explained in more detail. The second gear 21 is mounted on the end of the arm 17 as shown in FIG. 9. The second gear 21 is preferably made of POM (Polyoxymethlene) in this embodiment. However, metals, such as aluminum and aluminum alloys, and composite materials, such as materials consisting of a resin and a metal, are also suitable materials for the second gear 21. The central axis of the reference circle of the gear 21 coincides with the central axis of the hole 50 shown in FIG. 4. The arc length of the reference circle formed by the tooth profile needs to be sufficiently long enough to move the small laser beam spot over the entire range of tracks. The second gear 21 and the end of the arm 17 should be made as thin as possible in order to minimize the overall height of the disk drive 1. The preferred tooth profile of the gears 21 and 22 is an involute profile. However, other tooth profiles may be used. In FIG. 9, the involute tooth profile is described schematically.

Usually there is a gap (called backlash) for preventing multiple contacts between meshing gears. Such a gap causes slippage between the two gears at the beginning of reverse rotation. In the embodiment, slippage occurs in the rotation of the first gear 22 at every change in the direction of rotation. Such slippage results in tracking errors, sound generation, and vibration generation. In the preferred embodiment, there is provided a backlash eliminating arrangement comprising two gears 100 and 101, and leaf springs 102 which push the two gears 100 and 101 in opposite rotary directions. A more detailed explanation of this backlash eliminating arrangement will now be described. The second gear 21 includes a lower gear 100 and an upper gear 101, which both have the same tooth profile. The lower gear 100 is secured to the swing arm 17, while the upper gear 101 is supported by the lower gear 100 through the two leaf springs 102. One end of each leaf spring is secured to the lower gear 100 at side wall 104, and the other end of each leaf spring is attached to the upper gear 101. Moreover, the upper gear 101 is guided by a flange 103, which is formed on the lower gear 100 in order to keep the upper gear 101 parallel to the lower gear 100. The leaf springs 102 are set so as to cause opposite rotary motions of the upper and lower gears 100 and 101. Furthermore, an extension line extending in the longitudinal direction from each of the leaf springs 102 is set so as to cross the central axis of the reference circle of the second gear 21, which is the central axis of the rotary motion of the arm 17. This setting of the springs 102 allows for the precise movement of the upper gear 101 around the central axis of reference circle of the lower gear 100 and of the rotary motion of the arm 17, even though the upper gear 101 is suspended elastically by the springs 102.

The side wall 104 of the lower gear 100 is curved along an arc having the same central axis as the reference circle of the gears 100 and 101. This side wall 104 contacts an end surface of the upper gear 101 to aid in the guiding of the upper gear 101. This arrangement makes sure that each of the central axes of the reference circles of the gears 100 and 101 coincide, and that the first gear 22 properly meshes with both the upper gear 101 and the lower gear 100, without any slippage during switching between different directions of rotary motion of the motor 19.

Instead of the arrangement with the leaf springs 102 just described, other arrangements which cause the rotary motion in opposite directions of the gears 100 and 101 may also be utilized to eliminate backlash.

Instead of using two leaf springs 102, a single leaf spring mounted in the middle portion (between the two leaf springs 102 shown in the FIG. 9) may be used to eliminate backlash. However, the use of two springs 102 is preferred.

As another alternative, the backlash eliminator may be arranged on the first gear 22, and could include two gears and a torsion spring set between the two gears. However, it is preferred that the backlash eliminator be arranged on the second gear 21 because this gear is larger than the first gear 22.

As an additional alternative, a wire, such as a piano wire rod, may be used as a spring instead of using the leaf spring(s) 102.

Referring next to FIG. 10 to FIG. 13, an electromagnet for providing a magnetic field over the small spot on the disk illuminated by the laser beam will be explained. There are two basic types of electromagnet configurations. In the first type of configuration, the electromagnet is moved according to the position of the small laser beam spot on the disk before providing the magnetic field over the spot. In the second type, the electromagnet provides the magnetic field over the portion to be scanned by the spot without movement of the electromagnet according to the spot.

The electromagnet of the first type includes two further types. One is a slider-type electromagnet in which airflow between the electromagnet and the disk 30 creates a gap therebetween. Another type is a rigidly suspended type of electromagnet in which a constant gap between the electromagnet and the disk 30 is created by a rigid suspension of the two relevant components.

FIG. 10 shows an electromagnet suspension assembly of the slider-type electromagnet adopted in the first embodiment. The assembly, which includes a load beam 59 with bent ends along its longitudinal direction and a magnetic head 58 with a electromagnet 111, is bolted on the head suspension fixing part 60, which is in turn formed on the arm 17 (not shown in FIG. 10). The magnetic head 58 is secured to a tip of the load beam 59. A taper formed at one end of the head 58 operates as an airflow inlet, which airflow causes a lifting force upon the head 58. The electromagnet 111 produces a magnetic field, and applies the magnetic field to the disk 30. The electromagnet 111 is designed to be positioned on the opposite side of the disk 30 from the small beam spot. The small gap between the head 58 and the disk 30 allows the slider-type electromagnet to be small, and it also allows it to be able to apply the magnetic field to the disk 30 with low power dissipation and low heat generation.

FIGS. 11A and 11B schematically show an assembly of the rigidly suspended type of electromagnet. FIG. 11A shows a electromagnet head 120 mounted upon the tip of a solid suspension 121, which is bolted to the head suspension fixing part 60 formed on the arm 17. FIG. 11B shows a detailed cross-sectional view of the head 120. The head 120 includes a yoke 122 that is made from a ferromagnetic material, and a coil 123 that is mounted around a central projection of the yoke 122. Only the tip of the central projection projects from the head 120 toward the disk 30 (not shown in FIGS. 11A and 11B). The shape of the head 120 is suitable for applying a magnetic field upon a desired portion of the disk 30. The assembly of the electromagnet suspended by the solid suspension allows for a greater head-disk gap than the slider-type head shown in FIG. 10, and therefore the assembly can apply a magnetic field to the disk 30 even in cases where there is dust on the disk 30.

The load beam 59 (of the FIG. 10 embodiment) and the suspension 121 (of the FIGS. 11A–11B embodiment) are mounted on locations other than the rotary axis of the arm 17 (see FIG. 4), which allows the length of the load beam 59 and the suspension 121 to be shortened.

FIG. 12 shows another arrangement in which the suspension is adjustable around the rotary axis of the arm 17 before being bolted on a portion of the arm 17 near the rotary axis. This arrangement allows for easy adjustment of the position of the head, because the head position can be adjusted by simply rotating the assembly. Details of this arrangement shown in FIG. 12 include a head 127, which is of the slider-type, and a fixture 125, which has a hole that mates with a shaft 70. The shaft 70 is secured to the base plate 12 (not shown), and is bolted to the arm 17. The head 127 is mounted on the tip of a suspension 126, which is secured upon the fixture 125. The fixture 125 is pressed by a coiled spring 72, which is arranged between the fixture 125 and a stop ring 73.

Now referring to FIGS. 13A–13B, an electromagnet of the second type will be described in detail. FIG. 13A shows a magnet head assembly 130, and FIG. 13B shows the location of the assembly 130 in relation to the disk 30. The magnetic field emitted from the arc-projection 132 of the yoke 131 is applied to the disk 30 without movement of magnet head assembly 130. The arc shape of the projection 132 is similar to the shape of the area traced by the small beam spot, which allows for effective illumination of the magnetic field on the proper locations on the disk 30.

The yoke 131 is made from a ferromagnetic material, and has the arc-projection 132 located upon the side that faces toward to the disk 30, as shown in FIG. 13B. A coil 133 is mounted around the body of the yoke 131, and is connected to a drive-circuit (not shown) for applying a current to the coil 133 by a lead.

A case 134 and a cover 135 are also made from a ferromagnetic material, and serve to shield the disk 30 from any leaking magnetic field. The head assembly 130 is mounted on the base plate 12 or the frame 11, and not on the arm 17. The head assembly 130 can apply a magnetic field over the desired portion on the disk 30 without moving the assembly 130. Such an arrangement helps to decrease the load upon the arm 17, which helps to decrease the size and weight of arm 17, and also contributes to the overall miniaturization of the disk drive.

As the principal arrangement has been described hereinabove, the operation of the disk drive 1 will be described next. The disk 30 mounted on the turntable 40 is rotated at the predetermined rotational speed by the spindle motor 16. The signal detected by the optical detector 54 is processed in a processing circuit (not shown), and is converted into both a focusing signal (which is applied to the focusing coils 93) and a tracking signal (which is applied to the tracking coils 94 in the lens actuator 20). The objective lens 57 is moved by the focusing coils 93 and the tracking coils 94, and illuminates a small beam spot upon a track. The read and/or write operations can then be executed.

The motor 19 operation for accessing a particular track will be explained next. The necessary rotation of the motor 19 is determined and controlled according to the distance between the beam spot's current position and the position of the track being accessed. The rotary motion of the motor 19 is transferred to the arm 17 through the gears 21 and 22, and the arm 17 is rotated through the selected angle according to the motor rotation around the rotary axis of the pivotable supporting assembly 18. After the arm 17 has been rotated, the small beam spot on the disk from the objective lens 57 can illuminate the desired track. Using a similar process, the laser beam can be illuminated upon any other track that is desired to be accessed.

The effects of the present invention are the following. As the arm 17 is steadily supported at two locations, the pivotable supporting assembly and the gears 21 and 22 allow for stable read and/or write operations, even under vibrations caused by shocks from outside of the disk drive 1. Furthermore, as the load applied to the pivotable supporting assembly 18 has been decreased, the small, lightweight, and low cost assembly of the present invention can be realized. Additionally, the large reduction ratio of the second gear 21 to the first gear 22 allows for the use of a low output torque drive-motor, which also leads to disk drive of smaller size and lower cost. Also, selection of such a large reduction ratio leads to easy and/or precise control of the objective lens position, because the precise movement of the arm 17 is controlled by a large rotational angle of the motor 19. Further, the selection of the large reduction ratio enables read and/or write operations upon optical disks of higher data storage density.

Next, the second preferred embodiment will be described with reference to FIGS. 14A–14B. The second embodiment relates to an optical disk drive 160 having an arrangement for decreasing the load to the pivotable supporting assembly 18 by changing the location of the optical head 80. In the second embodiment, the parts having the same functions as in the first embodiment are designated by similar numerals.

For decreasing the bending moment applied to the pivotable supporting assembly 18, the optical head 80 is mounted upon the arm 17 at both sides of the assembly 17, as shown in FIG. 14A. The disk drive 160 is adapted to the specifications based on "DB 20 Form Factor," as outlined in "Device Bay Interface Working Draft," proposed by a group of people from Compaq, Intel, and Microsoft. The outer dimensions of the disk drive 160 are 130 mm wide, 20 mm high, and 141.5 mm deep. The disk drive 160 can operate with disks adapted to the standard: "information technology—data interchange on 90 mm optical disk cartridges-Capacity 640 Mbytes per cartridge" in ISO/IEC 15041. However, it is contemplated that the present invention may also be applied to disks and disk drives employing other specifications and standards.

The base plate 161 is suspended elastically in a similar manner to that described in the first embodiment. On the backside of the base plate 161, there is a printed circuit board 163, which includes circuitry thereon. The base plate 161 is mounted to a frame 162. On the front panel, there is an opening with a door for transferring the disk 165 (which is located within the cartridge 166) into and out of the disk drive 160. On the back panel, there is mounted a connector, for a cable for transferring data to other equipment, and a connector for a cable for supplying power. As in the first embodiment, the spindle motor 16 is preferably not centered along the longitudinal direction of the disk drive 160, but is instead mounted closer to the front panel. The disk 165 has a metal plate (not shown) and a magnet (not shown), which is mounted upon a turntable 40, that is secured upon the axis of the spindle motor 16. By the attraction between the magnet and the metal plate, the disk 165 is secured upon the turntable 40 such that the axes of both the disk and the turntable coincide.

The pivotable supporting assembly 18 is mounted near the left side of the disk drive 160, as shown in FIG. 14A. The arm 17, which is supported by the assembly 18, supports the optical head 80. The main parts of the optical head 80 are located on the left side of both the arm 17 and the assembly 18. The lens actuator 20, upon which is mounted the objective lens 57, and the bending mirror (not shown) are both mounted towards the right side of the arm 17. At the tip of the arm 17, the second gear 21 is mounted. The second gear 21 is configured to mesh with the first gear 22, which is secured upon the axis of the motor 19. An electromagnet (not shown) for applying a magnetic field to the disk 165 is mounted on the arm 17 in a similar manner to that shown in the first embodiment.

In the second embodiment, as the optical head 80 is mounted on both sides of the arm 17 (when considered with respect to the supporting assembly 18) the bending moment applied to the assembly 18 is decreased, which leads to smoother rotary motion because of the decrease in friction, as well as the existence of only partial contact between the shaft and the sleeve in the assembly 18. This arrangement also allows for the use of a smaller drive motor, which helps to reduce the overall size of the disk drive. And still further, as the bending moment applied to the arm 18 has been decreased, it is possible to make arm 18 thinner or smaller in width (while still maintaining permissible deflections of the arm 18), which also leads to a smaller sized disk drive 160.

The third preferred embodiment will be described with reference to FIG. 15. In the third preferred embodiment, the longitudinal direction of the arm 17 is approximately coincident with the direction shown by arrow "A", which is the direction of travel of the disk when it is being inserted or ejected. This differs from the first and second embodiments in which the longitudinal direction of the arm 17 is approximately perpendicular to direction "A". The new arrangement in the third embodiment helps to reduce the width of the drive 170. The parts in this third embodiment that have the same functions as those in the first embodiment are designated by similar numerals.

In the third embodiment, the pivotable supporting assembly 18 is mounted in an area near the back side of the drive 170 and the motor 19 is mounted in an area near the front side of the drive 170. This arrangement allows for the mounting of a disk-cartridge 31 of 101.6 mm wide, 146 mm deep, and 25.4 mm high. An electromagnet (not shown) for applying a magnetic field to the disk 30 is mounted on the arm 17 in the same manner as shown in the first embodiment.

Referring now to FIG. 16, the fourth preferred embodiment will be described. Components having the same functions as those in the first embodiment are designated by similar numerals. The optical disk drive 200 of the fourth embodiment has the following arrangement: the arm 17 supports the bending mirror (not shown) and the lens actuator 20 (with the objective lens) on its right side, with respect to the pivotable supporting assembly 18. The other parts of the optical head 80 and the second gear 21 are mounted on the left side, with respect to the assembly 18. This arrangement shortens the distance between the assembly 18 and the second gear 21, which decreases the rotational moment around the axis of the assembly. By decreasing the rotational moment, a small motor may be used as the motor 19.

In the first to fourth embodiments, each of the optical disk drives 1, 160, 170, and 200 has an electromagnet. But as described above, a read-only drive only has no electromagnet. Thus, the present invention can be easily modified for use as a read-only drive by simply eliminating the electromagnet from the above described embodiments. In the descriptions of the preferred embodiments, the circuits related to the drives, such as the circuits for the drive-motor, for the optical head, for the read and/or write operations, and for signal processing, have not been given in detail because these features are well known in the art.

The preferred embodiments of the drives use disks of 120 mm and 90 mm diameters. However, the present invention is also applicable to optical disk drives that use disks having other diameters, such as 300 mm, 130 mm, 63 mm and 45 mm.

Additionally, this invention is also applicable to disks with two surfaces that are to be read and/or written, such as disks made by bonding two disks together.

Further, the present invention is also applicable to an optical disk drive having a plurality of disks.

In addition, the present invention is also applicable to optical disk drives installed in various data processing apparatuses, such as personal computers, work station computers, and image processing apparatuses.

Further, the present invention is applicable to optical disk drives powered by power sources other than AC current, such as those powered by batteries.

Next, the effects of the present invention will be described. The swing arm is driven through a train of gears which increases the torque of the small output motor, which allows for cost savings and miniaturizing of the optical disk drive. Further, using a large reduction ratio gear train makes the precise control of the arm motion possible.

As the arm for mounting the optical parts is supported at two positions, the read and/or write operations are performed stably, even in the presence of vibrations originating outside of the disk drive. The decrease in the bending moment allows the pivotable supporting assembly to be made small, light-weight, and at a low-cost. As the arm supports the lens actuator for position-control of the objective lens in the tracking and focusing directions, the disk drive can use optical disks having a small track pitch and a high data storage capacity.

Furthermore, the arrangement of optical parts on opposite sides of the arm around the pivotable supporting assembly further decreases the bending moment that is applied to the pivotable supporting assembly, which allows for further size reductions of the assembly and the disk drive, further lowering the cost of the disk drive.

The pivotable supporting assembly of the present invention that includes a shaft and a sleeve permits height reductions in the disk drive, as well as cost reductions.

The present arrangement of the electromagnet allows the disk drive to read information from the disk, as well as being able to write information on the disk.

The present backlash eliminator allows for precise rotary motion of the arm when its direction of rotation is changed by the drive-motor.

The present invention may be embodied in the other specific forms without departing from the sprit or essential characteristics thereof While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An optical disk drive for use with an optical disk, comprising:

a rotary motor;

a first toothed gear mounted upon said rotary motor;

an optical unit for illuminating a laser beam onto the optical disk, including an objective lens and an actuator mounted within said optical unit for moving said objective lens in both a focusing direction and a direction crossing tracks of said optical disk;

a swing arm for supporting said optical unit;

a second toothed gear mounted upon said swing arm, said second toothed gear being a sector gear and being configured and arranged to mesh with said first toothed gear, wherein said second toothed gear is divided into two associated gears that are associated together through at least one spring to eliminate backlash within the mesh between said first toothed gear and said second toothed gear, said at least one spring being used to apply a biasing force for rotating one of said associated toothed gears with respect to the other of said associated toothed gears, wherein said spring includes at least one leaf spring, and further wherein said at least one leaf spring is arranged so that a longitudinal direction of said at least one leaf spring is directed toward a central axis of a reference circle of said associated toothed gears; and a supporting means for supporting said swing arm to pivotally move along a plane parallel to a surface of said optical disk, wherein said swing arm is pivoted by rotation of said rotary motor conveyed through a gear train that includes said first toothed gear and said second toothed gear.

2. The optical disk drive according to claim 1, wherein said supporting means is positioned near a distal end of said swing arm, and said second toothed gear is positioned on said swing arm at an end opposite to said distal end.

3. The optical disk drive according to claim 2, wherein said optical unit includes an objective lens, and further wherein said objective lens is located between said supporting means and said second toothed gear.

4. The optical disk drive according to claim 1, wherein a first portion of said optical unit is located on one side of said supporting means, and a second portion of said optical unit is located on a different side of said supporting means.

5. The optical disk drive according to claim 1, wherein said optical disk drive includes an opening therein for inserting and removing the optical disk in a first direction, and further wherein a longitudinal axis of said swing arm, which extends between a connection point with said supporting means and said second toothed gear, extends in a direction generally parallel to said first direction.

6. The optical disk drive according to claim 1, wherein said optical disk drive includes an opening therein for inserting and removing the optical disk in a first direction, and further wherein a longitudinal axis of said swing arm, which extends between a connection point with said supporting means and said second toothed gear, extends in a direction generally perpendicular to said first direction.

7. The optical disk drive according to claim 1, wherein said supporting means includes a shaft and a sleeve configured and arranged to mate with said shaft, and further wherein one of said shaft or said sleeve is mounted on said swing arm, and the other is mounted on a base plate of said optical disk drive.

8. The optical disk drive according to claim 1, wherein said disk is a magneto-optical disk.

9. The optical disk drive according to claim 8, further comprising a bias magnet for reorienting a magnetic orientation on said magneto-optical disk, wherein said bias magnet supplies a magnetic field over a portion of said disk traced by a spot illuminated by said laser beam.

10. The optical disk drive according to claim 8, further comprising a bias magnet mounted on said swing arm for reorienting a magnetic orientation on said magneto-optical disk, wherein said bias magnet supplies a magnetic field over a portion illuminated by said laser beam.

11. The optical disk drive according to claim 1, wherein one of said associated gears is superimposed upon the other of said associated gears, and further wherein one end of said spring is connected to one of said associated gears and the other end of said spring is connected to the other of said associated gears.

12. An optical disk drive for use with an optical disk, comprising:

a rotary motor;

a first toothed gear mounted upon said rotary motor;

an optical unit for illuminating a laser beam onto the optical disk;

a swing arm for supporting said optical unit;

a second toothed gear mounted upon said swing arm, said second toothed gear being a sector gear and being configured and arranged to mesh with said first toothed gear, said second gear including two associated gears, wherein said associated gears are associated together through a spring, which is used to apply a biasing force for rotating one of said associated toothed gears with respect to the other of said associated toothed gears in order to eliminate backlash within the mesh between said first toothed gear and said second toothed gear, wherein said spring includes at least one leaf spring, and further wherein said at least one leaf spring is arranged so that a longitudinal direction of said at least one leaf spring is directed toward a central axis of a reference circle of said associated toothed gears; and a supporting means for supporting said swing arm to pivotally move along a plane parallel to a surface of said optical disk, wherein said swing arm is pivoted by rotation of said rotary motor conveyed through a gear train that includes said first toothed gear and said second toothed gear.

* * * * *